United States Patent
Oklejas, Jr.

(10) Patent No.: US 11,021,377 B1
(45) Date of Patent: Jun. 1, 2021

(54) SUBMERGED REVERSE OSMOSIS SYSTEM AND METHOD FOR OPERATING THE SAME

(71) Applicant: Fluid Equipment Development Company, LLC, Monroe, MI (US)

(72) Inventor: Eli Oklejas, Jr., Newport, MI (US)

(73) Assignee: FLUID EQUIPMENT DEVELOPMENT COMPANY, LLC, Monroe, MI (US)

( * ) Notice: Subject to any disclaimer, the term of this patent is extended or adjusted under 35 U.S.C. 154(b) by 84 days.

(21) Appl. No.: 16/564,021

(22) Filed: Sep. 9, 2019

Related U.S. Application Data

(60) Provisional application No. 62/729,674, filed on Sep. 11, 2018.

(51) Int. Cl.
| | | |
|---|---|---|
| *C02F 1/44* | (2006.01) | |
| *B01D 61/02* | (2006.01) | |
| *B01D 61/08* | (2006.01) | |
| *C02F 1/00* | (2006.01) | |
| *B01D 61/10* | (2006.01) | |
| *B01D 61/06* | (2006.01) | |
| *C02F 103/08* | (2006.01) | |

(52) U.S. Cl.
CPC ............ *C02F 1/441* (2013.01); *B01D 61/025* (2013.01); *B01D 61/06* (2013.01); *B01D 61/08* (2013.01); *B01D 61/10* (2013.01); *C02F 1/001* (2013.01); *B01D 2315/06* (2013.01); *C02F 2103/08* (2013.01)

(58) Field of Classification Search
CPC .. B01D 61/06; B01D 2315/06; B01D 61/025; B01D 61/08; B01D 61/10; C02F 1/441; C02F 1/001; C02F 2103/08
See application file for complete search history.

(56) References Cited

U.S. PATENT DOCUMENTS

| | | | | |
|---|---|---|---|---|
| 2004/0206681 A1* | 10/2004 | Gordon | ................. | B01F 5/0688 210/259 |
| 2008/0290032 A1* | 11/2008 | Ton That | ............... | B01D 61/12 210/651 |
| 2012/0067820 A1* | 3/2012 | Henthorne | ............. | B01D 61/08 210/641 |
| 2017/0349455 A1* | 12/2017 | Katz | ....................... | E21B 43/20 |
| 2018/0290902 A1* | 10/2018 | Aronson | ................ | B01D 61/08 |

OTHER PUBLICATIONS

Greenlee et al "Reverse osmosis desalination: Water sources, technology, and today's challenges", Water Research 43 (2009) 23 1 7-2348.*

* cited by examiner

*Primary Examiner* — Krishnan S Menon
(74) *Attorney, Agent, or Firm* — Harness, Dickey & Pierce, P.L.C.

(57) ABSTRACT

A system and method of operating the same includes a membrane chamber comprising a membrane, an inlet, a concentrate outlet and a permeate outlet. The membrane chamber is located in a body of water at a predetermined depth. A turbocharger is disposed at about the predetermined depth and includes a pump portion coupled to the inlet of the membrane chamber and a turbine portion coupled to the concentrate outlet. A pump communicates pressurizing feed fluid and communicates the feed fluid to the turbine portion of the turbocharger though a feed pipe. A permeate pipe extends from the permeate outlet to about the surface of at the body of water.

11 Claims, 5 Drawing Sheets

SUBMERGED REVERSE OSMOSIS SYSTEM AND METHOD FOR OPERATING THE SAME

CROSS-REFERENCE TO RELATED APPLICATIONS

This application claims the benefit of U.S. Provisional Application No. 62/729,674 filed on Sep. 11, 2018. The disclosures of the above application incorporated herein by reference.

TECHNICAL FIELD

The present disclosure relates generally to a reverse osmosis system, and, more specifically, to a method and system for operating a submerged reverse osmosis system.

BACKGROUND

The statements in this section merely provide background information related to the present disclosure and may not constitute prior art.

Referring now to FIG. 1, reverse osmosis systems are known for using a lot of energy. In a reverse osmosis system a membrane chamber 10 has a membrane 12 disposed therein. The membrane chamber has an inlet 14, a concentrate outlet 16 and a permeate outlet 18. A high pressure feed fluid is communicated through the inlet 14. In order for fresh water to be communicated to the permeate outlet 18 through the membrane 12, the feed fluid must be substantially elevated in pressure. A feed pump is used, which typically consumes a considerable amount of energy. The concentrate outlet 16 of the membrane chamber 10 removes concentrate at a slightly lower pressure than the pressure of the feed fluid at the inlet 14. Because of the high pressures required at the inlet 14, a considerable amount of energy must be used by the system.

Referring now to FIG. 2, a submerged reverse osmosis system 20 is illustrated. The membrane chamber 10 is disposed between about 600 and 800 meters below a surface 22 of a body of water such as the ocean. The membrane chamber 10 has a first pump 24 that provides a slight pressure differential to drive water across the face of the membrane 12. A pump motor 26 is used to drive the pump 24 to provide the desired pressure.

The permeate outlet 18 has a second pump 28 coupled thereto. The second pump 28 along with a second motor 30 drives the low pressure permeate to the surface 22. At the depth between 600 and 800 meters, the sea water pressure is sufficient to drive the reverse osmosis process when the permeate outlet pressure is maintained close to the atmospheric pressure. The pump 24 provides a slight pressure differential to drive water across the face of the membrane array.

Further areas of applicability will become apparent from the description provided herein. It should be understood that the description and specific examples are intended for purposes of illustration only and are not intended to limit the scope of the present disclosure.

SUMMARY

This section provides a general summary of the disclosure, and is not a comprehensive disclosure of its full scope or all of its features.

The present disclosure provides an improved submerged reverse osmosis system that uses a reduced amount of energy.

In one aspect of the disclosure, a system includes a membrane chamber comprising a membrane, an inlet, a concentrate outlet and a permeate outlet. The membrane chamber is located in a body of water at a predetermined depth. A turbocharger is disposed at about the predetermined depth and includes a pump portion coupled to the inlet of the membrane chamber and a turbine portion coupled to the concentrate outlet. A pump communicates pressurizing feed fluid and communicates the feed fluid to the pump portion of the turbocharger though a feed pipe. A permeate pipe extends from the permeate outlet to about the surface of the body of water.

In another aspect of the disclosure, a method includes pressurizing feed fluid to form pressurized feed fluid, communicating the pressurized feed fluid through a feed pipe to a pump portion of a turbocharger located beneath a surface of a body of water at a predetermined depth, increasing a pressure of the pressurized feed fluid in the pump portion, communicating the pressurized feed to a membrane chamber, forming permeate in the membrane chamber, communicating the permeate to the surface though a permeate pipe and communicating concentrate from the membrane chamber at about the predetermined depth. A pipe may be used to discharge concentrate some distance from the feed inlet to eliminate potential for concentrate to be recirculated through the membrane.

In another aspect of the disclosure, a system includes a membrane chamber comprising a membrane, an inlet, a concentrate outlet and a permeate outlet. The membrane chamber is located in a body of water at a predetermined depth. A first pump is coupled to the concentrate outlet drawing pressurizing feed fluid across the membrane by drawing concentrate out of the membrane chamber. The first pump discharges the concentrate at about the predetermined depth. A permeate pipe communicates permeate from the permeate outlet to about a surface of the body of water.

Further areas of applicability will become apparent from the description provided herein. The description and specific examples in this summary are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
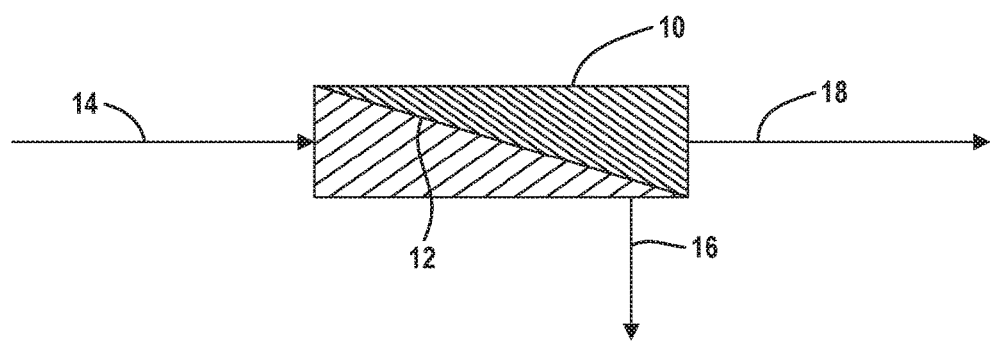
FIG. 1 is a cutaway schematic view of a membrane chamber according to the prior art.
Figure 2:
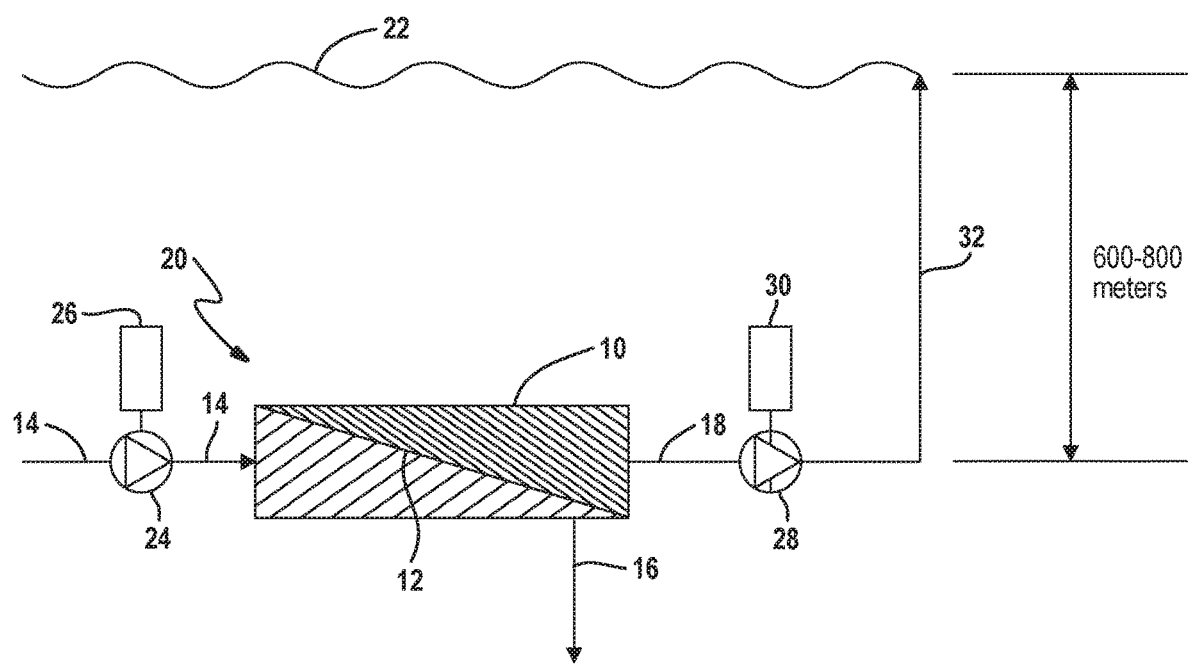
FIG. 2 is a schematic view of a submerged reverse osmosis system according to the prior art.

The following description is merely exemplary in nature and is not intended to limit the present disclosure, application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

Figure 3:
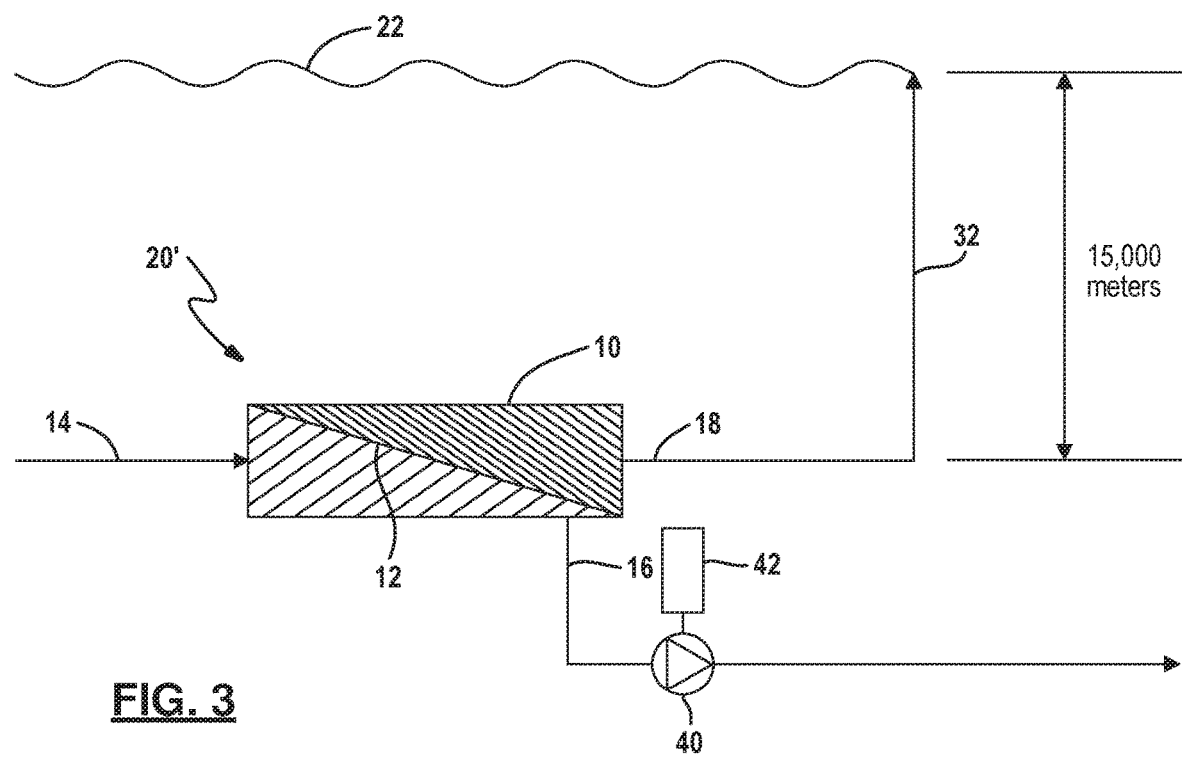
FIG. 3 is a schematic view of a submerged reverse osmosis system according to the present disclosure.

Referring now to FIG. 3, a submerged reverse osmosis system 20' is set forth. In this example the membrane chamber has a concentrate pump 40 that is driven by a motor 42 fluidically coupled to the membrane chamber 10. In particular, the pump 40 is coupled to the concentrate outlet 16 of the membrane chamber 10 and draws concentrated fluid that does not pass through the membrane 12 across the face of the membrane 12.

In the example set forth in FIG. 3, the membrane chamber 10 may be submerged to a predetermined depth of approximately 15,000 meters below a surface of a body of water. The permeate pipe 32 extends to the surface 22 of the water. The permeate in the pipe 32 has a specific gravity of about 1.00. The ocean water has a specific gravity of about 1.025. The sea water exerts a pressure of about 2.5 percent higher than the permeate of the same column height (a pressure difference). At 15,000 meters sea water will exert a pressure of about 1537.5 Bar and about 15,000 meter column of permeate exerts about 1500 Bar of pressure. The seawater feed pressure is thus about 37.5 Bar higher than the pressure of the permeate within the permeate pipe 32. The pressure difference is sufficient to generate reverse osmosis production. That is, the osmotic pressure of seawater at the depth is exceeded by the pressure difference. The membrane chamber 10, the pump 40 (or feed pump 50 as described below) and the concentrate outlet 16 are located at a depth where the difference in head (pressure) between the ambient sea water and a column of permeate extending to the surface exceeds the osmotic pressure of the sea water at the membrane depth.

Figure 4:
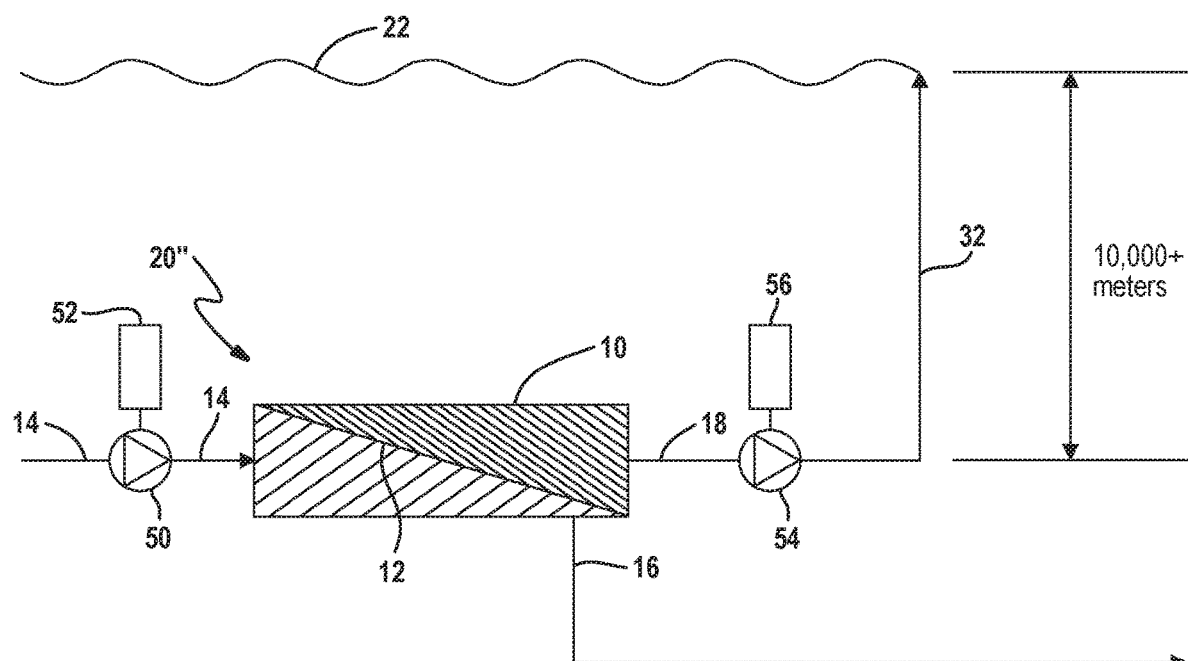
FIG. 4 is a second example of a submerged reverse osmosis system according to the present disclosure.

Pump 40 is a relatively small pump and is used to draw the feed fluid across the face of the membrane array of membrane 12 by removing concentrate from the membrane chamber 10 as mentioned above. That is, the pump 40 is sized to be large enough to draw fluid across the membrane array without a large penalty for energy consumption. Pump 40 would typically develop about 1.0 bar of pressure. Based on reasonable assumptions of pump and motor efficiencies, the energy consumption is about 0.1 kWh/m$^3$ of permeate. This value is less than 5% of the amount of energy consumed by a conventional seawater RO system. Referring now to FIG. 4, a second example of a system 20" is set forth. In this example, a circulation pump 50 driven by motor 52 is used for the same purpose as pump 40. That is, pump 50 also is used to move fluid over the surface of the membrane 12. In this example, the concentrate pump 40 is not used. However, in some examples both the concentrate pump 40 and the circulation pump 50 may be used. Typically, a higher capacity pump 50 than the pump illustrated in FIG. 3 is used. The pump 50 is also used to slightly pressurize the fluid that is entering the membrane chamber 10.

If the oceans were about 15,000 meters deep, the system would merely operate using the booster pump 54. However, such depth is unobtainable in most places and thus a booster pump 54 driven by a motor 56 is fluidically coupled to the permeate outlet. Such a system may work at a depth of about 7500 meters which is obtainable in parts of the ocean. In this example, the booster pump 54 adds about 19 Bar of pressure to drive the permeate flow to the surface 22. Of course, a lesser amount of depth may be used with a higher pressure pump. A lower pressure booster pump 54 may also be used if the depth is increased.

Figure 5:
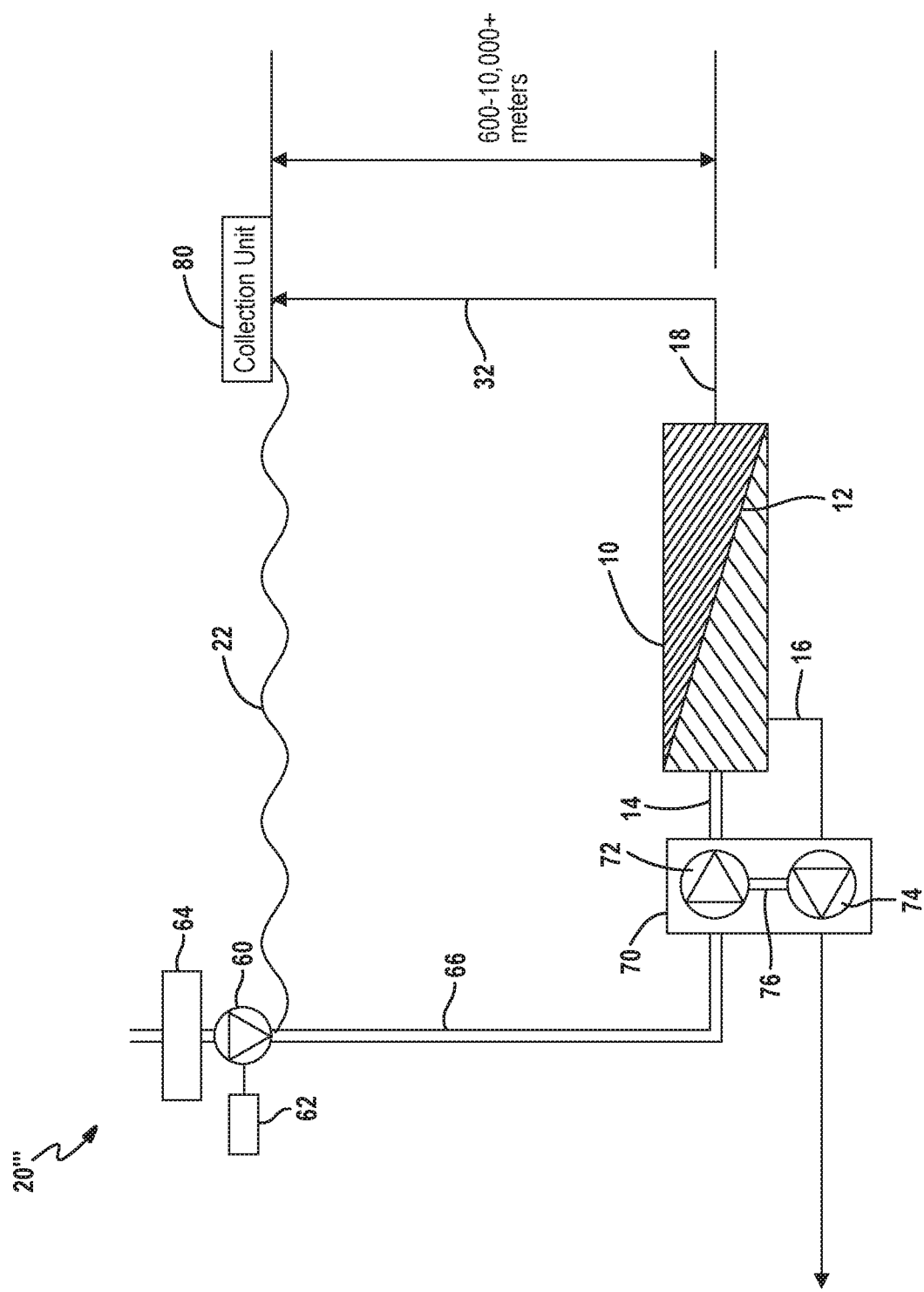
FIG. 5 is a schematic view of a submerged reverse osmosis system according to a third example according to the present disclosure.

Referring now to FIG. 5, the same elements are used from the prior figures. In this example, a system 20''' a surface pump 60 driven by a motor 62 is set forth. The surface pump 60 is at or near the surface 22 of the body of water. Prior to entering the surface pump 60 feed fluid is filtered in a filter 64. The filter 64 filters large contaminants from being pumped into the membrane chamber 10. By providing the filter 64 on the surface 22 maintenance is facilitated with easy accessibility. The pump 60 pressurizes the feed fluid and communicates the pressurized feed fluid into a feed pipe 66. The feed pipe 66 is coupled to a turbocharger 70. The turbocharger 70 includes a pump portion 72 that pressurizes the feed fluid and communicates the feed fluid to the inlet 14 of the membrane chamber 10.

The concentrate outlet 16 of the membrane chamber 10 is in fluid communication with the turbine portion 74 of the turbocharger 70. A common shaft 76 extends between the pump portion 72 and turbine portion 74. Thus, the relatively high pressure concentrate communicated through the concentrate outlet 16 rotates the turbine portion 74, common shaft 76 and the pump portion 72 which increases the feed fluid pressure. It can thus be said that the feed fluid entering the membrane chamber 10 is twice pressurized. In this example, the turbocharger do not require a motor and also does not require various types of lubricants such as oil or grease minimizing environmental impact. The water passing through the system is used to lubricate the turbocharger and the highly pressurized concentrate powers the turbine portion 74 which, in turn, adds pressure at the pump portion 72. In this example, the concentrate is communicated to the surrounding body of water at about the same depth as the membrane chamber 10. In this example, a depth of about 600 meters to about 10,000 meters is suitable for the depth of the membrane chamber 10. The permeate pipe 32 does not require an additional amount of pump boosting if the pump 60 and the pump portion 72 provide enough pressure in the system which acts in addition to the pressure from the depth of the membrane chamber.

A collection unit 80 is in fluid communication with the permeate pipe 32 and collects the permeate. The collection unit 80 may be on land or may be on a ship at or near the surface 22 of the body of water.

Figure 6:
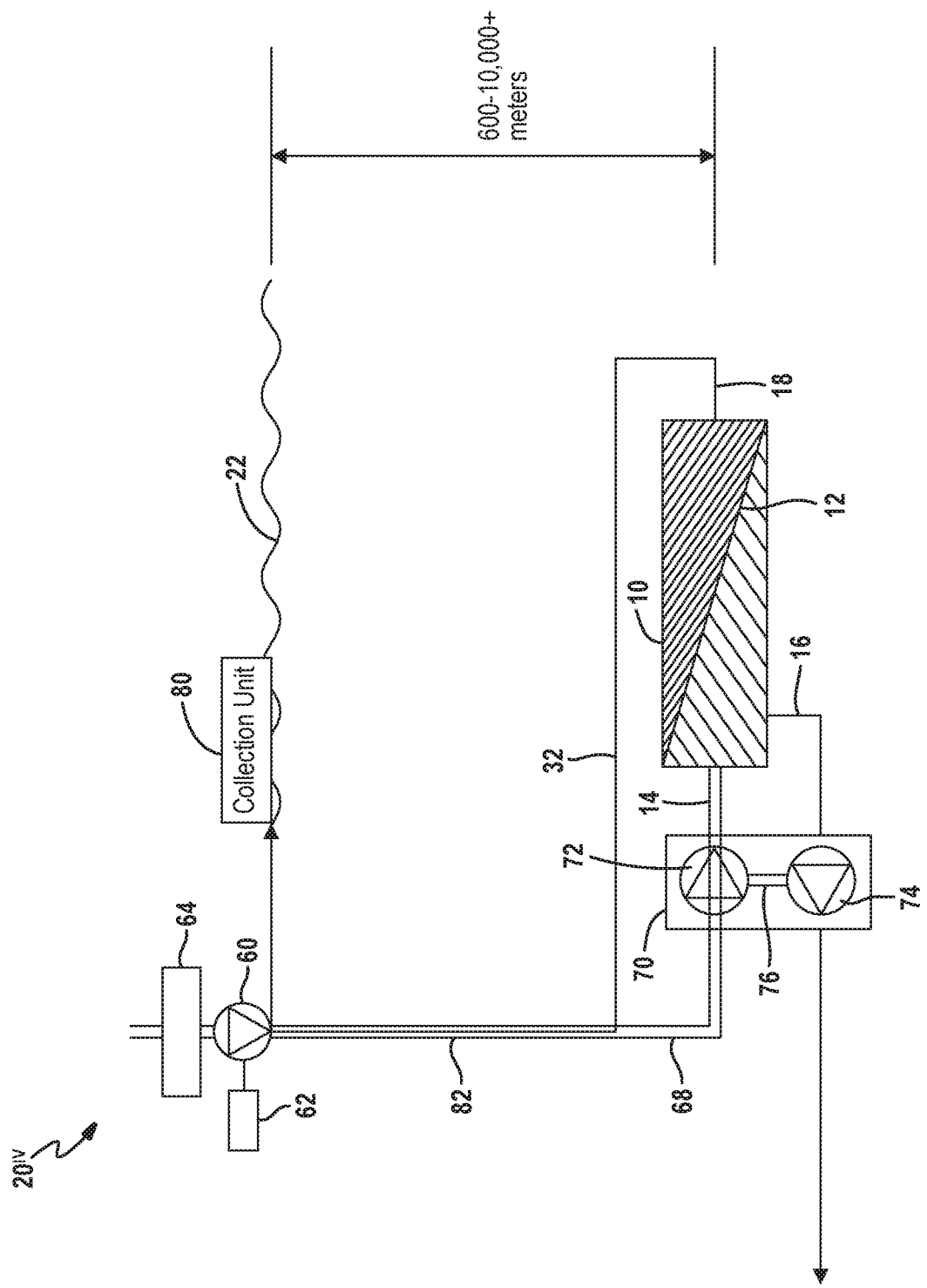
FIG. 6 is a fourth example of a submerged reverse osmosis system according to the present disclosure.

Referring now to FIG. 6, a similar system $20^{iv}$ to that set forth above is set forth. However, in this example, a substantial amount of the feed pipe 68 and the permeate pipe 32 are co-located. That is, one single enclosure 82 may be provided to run both the feed pipe 68 and the permeate pipe 32.

The feed fluid in the above examples may be salt water or brackish water depending upon the location. Brackish water has less concentration of total dissolved solids and thus the amount of pressure required to drive the system is lower. The feed pressure to drive the reverse osmosis system depends on the difference between the osmotic pressure of the feed stream and the permeate stream. In typical reverse osmosis systems, the permeate total dissolved solids is negligible. However, if the membrane allows significant salt passage, then permeate osmotic pressure will be relatively high. The difference in the osmotic pressure across the membrane is therefore reduced allowing permeate production with a lower feed pressure. A "loose" membrane will require less submergence. However, the permeate will require additional treatment by a surface RO system if the total dissolved solids exceeds a predetermined limit.

It should be noted that the system uses a very low amount of energy. The system is driven by gravitational potential energy. The dense concentrate remains at the submergence level at or near the membrane which is less dense than the permeate delivered to the surface. It should also be noted that the system is an open system. Because the brine or concentrate is not pumped to the surface the amount of energy is thus low. If the brine or concentrate was to be communicated to the surface nearly all of the energy saved would be used.

Figure 7:
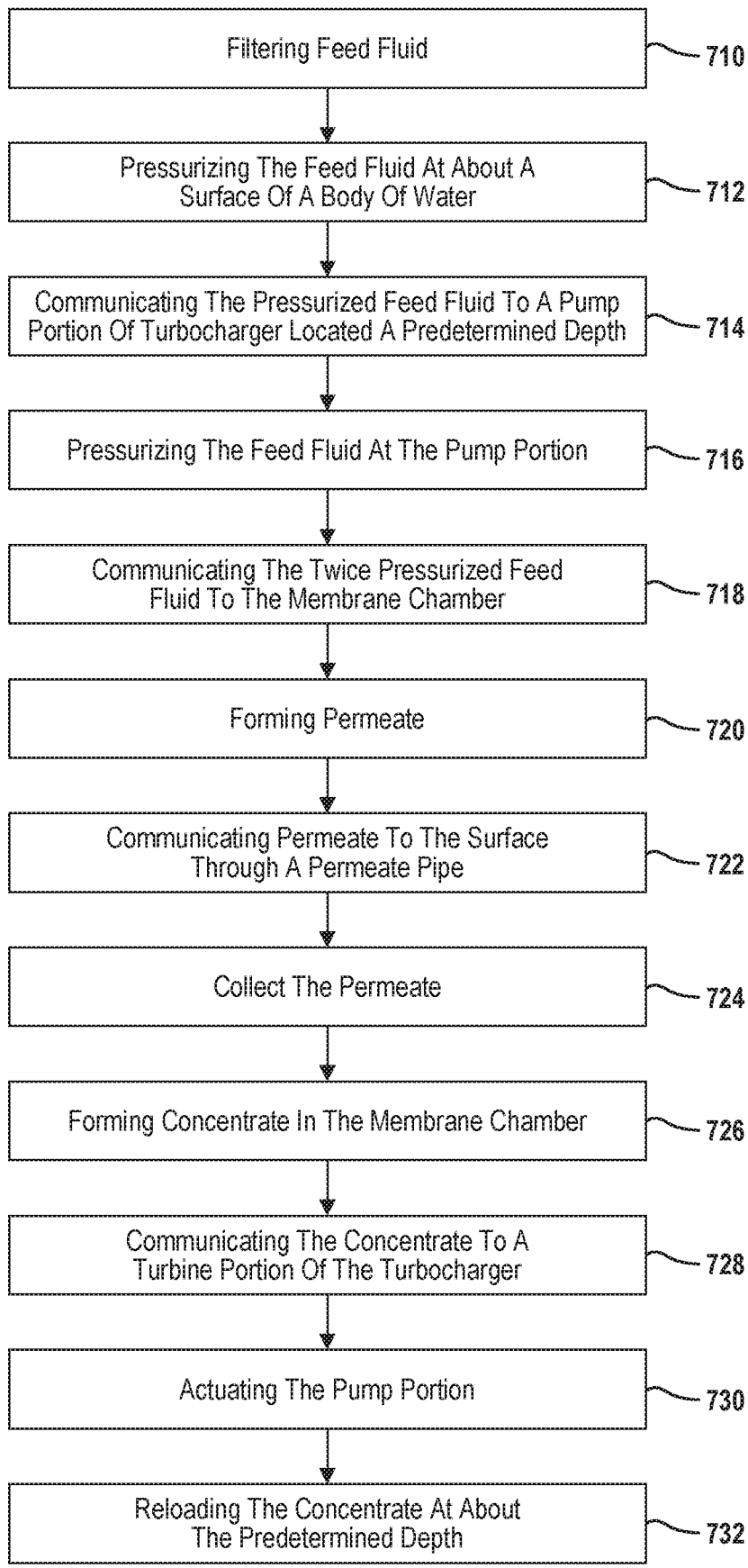
FIG. 7 is a flowchart of a method of operating a reverse osmosis system according to the present disclosure.

Referring now to FIG. 7, a method of operating a reverse osmosis system is set forth. In step 710, the feed fluid is filtered before entering a pump. Solids are removed from the feed fluid by a feed filter located at or near the surface. In step 712, the feed fluid is pressurized at a feed pump located at or about the surface of the body of water. The pressurized feed fluid is communicated to a pump portion of a turbocharger in step 716. Step 716 thus produces a twice pressurized feed fluid. In step 718, the twice pressurized feed fluid is communicated to the membrane chamber. In step 720, the permeate is formed by fluid passing through the membrane 12 in response to the pressure of the feed fluid. In step 722, permeate is communicated to the surface of the body of water through a permeate pipe. Permeate is collected in the collection unit 80 in step 724. In step 726 concentrate is also formed in the membrane chamber. In step 728 the concentrate is communicated to a turbine portion of the turbocharger. In step 730 the pump portion of the turbocharger is actuated in response to the motion of the turbine 74. In step 732 the concentrate is released at or about the same depth as the membrane chamber 10.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system comprising:
   a membrane chamber comprising a membrane, an inlet, a concentrate outlet and a permeate outlet, said membrane chamber located below a surface of a body of water at a depth of at least 600 meters;
   a turbocharger disposed at about the depth of at least 600 meters, comprising a pump portion coupled to the inlet of the membrane chamber, a turbine portion coupled to the concentrate outlet;
   a pump located about the surface of the body of water communicating pressurizing feed fluid and communicating the feed fluid to the turbine portion of the turbocharger though a feed pipe; and
   a permeate pipe extending from the permeate outlet to about the surface of at the body of water.

2. The system as recited in claim 1 wherein concentrate is discharged through the concentrate outlet and the turbine portion at about the depth of at least 600 meters.

3. The system as recited in claim 1 further comprising a filter filtering the feed fluid prior to the pump.

4. The system as recited in claim 1 wherein the depth of at least 600 meters is between about 600 meters and about 10000 meters.

5. The system as recited in claim 1 wherein the feed pipe and the permeate pipe are collocated.

6. The system as recited in claim 1 wherein the pressure of the feed fluid at the inlet of the membrane chamber is greater than a total of a permeate pressure and an osmotic pressure to move permeate in the permeate pipe to about the surface of the body of water.

7. A method comprising:
   pressurizing feed fluid to form pressurized feed fluid at a surface of a body of water;
   communicating the pressurized feed fluid through a feed pipe to a turbine portion of a turbocharger located beneath the surface of the body of water at a depth of at least 600 meters;
   increasing a pressure of the pressurized feed fluid in the turbine portion; and
   communicating the pressurized feed to a membrane chamber;
   forming permeate in the membrane chamber;
   communicating the permeate to the surface though a permeate pipe; and
   communicating concentrate from the membrane chamber at about the depth of at least 600 meters to the turbine portion.

8. The method of claim 6 wherein increasing pressure comprises increasing the pressure to move permeate in the permeate pipe to about the surface.

9. The method of claim 6 wherein prior to pumping, filtering the feed fluid.

10. The method of claim 6 wherein communicating permeate comprises communicating permeate through the permeate pipe collocated with the feed pipe.

11. The method of claim 6 wherein communicating the pressurized feed fluid through the feed pipe to the turbine portion of the turbocharger located beneath the surface of the body of water at the depth of at least 600 meters comprises communicating the pressurized feed fluid through the feed pipe to the turbine portion of the turbocharger located beneath the surface of the body of water between about 600 meters and about 10000 meters.

* * * * *